Figure 1:
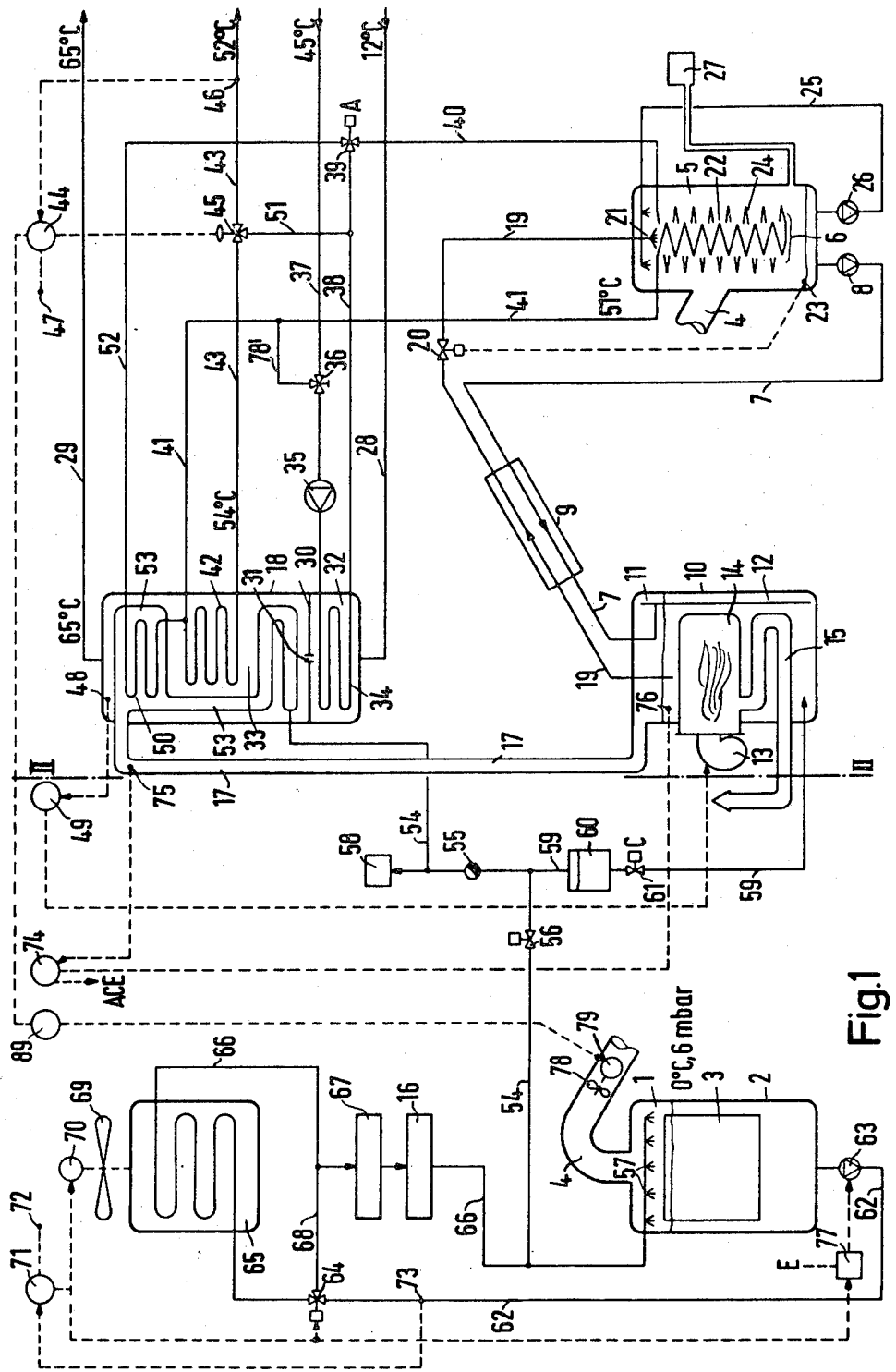

United States Patent [19]

Luthi et al.

[11] 4,285,209
[45] Aug. 25, 1981

[54] ABSORPTION HEAT PUMP INSTALLATION

[75] Inventors: Johannes Luthi, Neftenbach; George Ziegler, Winterthur, both of Switzerland

[73] Assignee: Sulzer Brothers Limited, Winterthur, Switzerland

[21] Appl. No.: 73,874

[22] Filed: Sep. 10, 1979

[30] Foreign Application Priority Data

Sep. 13, 1978 [CH] Switzerland .......................... 9588/78

[51] Int. Cl.³ ...................... F25B 27/02; F25B 15/00; F25B 13/00
[52] U.S. Cl. .................................... 62/238.3; 62/112; 62/238.6; 62/324.3; 62/476
[58] Field of Search .............. 62/238 B, 238 E, 324 B, 62/112, 476

[56] References Cited

U.S. PATENT DOCUMENTS

| Re. 27,074 | 2/1971 | Aerov et al. | 62/112 |
|---|---|---|---|
| 2,795,115 | 6/1957 | Kumm | 62/112 X |
| 3,388,557 | 6/1968 | Modahl et al. | 62/112 |
| 3,478,530 | 11/1969 | Aronson | 62/112 |
| 3,605,432 | 9/1971 | Wada | 62/324 B |
| 3,626,716 | 12/1971 | Leonard, Jr. | 62/324 B |
| 4,207,751 | 6/1980 | Kampfenkel et al. | 62/238 B |

Primary Examiner—Lloyd L. King
Attorney, Agent, or Firm—Kenyon & Kenyon

[57] ABSTRACT

The absorption heat pump installation operates with water as a working medium. The installation is equipped with an energy accumulator which acts as a direct evaportor and is operated through the choice of a suitable hydroscopic absorption medium at the triple point of water (6.1 mbar, 0° C.) as an ice accumulator. Water of a room heating system and/or a utility water heater serves as a coolant in the absorber and condenser of the installation. Outside air is preferably used as a low temperature heat source in which case the useful time for heat pump operation is extended without the danger of freezing of an outside-air heat exchanger at temperatures of the ambient air below 0° C.

17 Claims, 2 Drawing Figures

ABSORPTION HEAT PUMP INSTALLATION

This invention relates to an absorption heat pump installation. More particularly, this invention relates to an installation for the heating and air conditioning of dwellings such as single and multiple family houses.

Because of various programs for conserving energy, the use of heat pumps, especially for the heating and air-conditioning of rooms, has received considerable attention. Heat pump plants are known which operate with a compression or absorption loop ("gwf Gas- +Erdgas", vol. 119, (1978), No. 3 Page 107 "Operating Experience with a Gas Absorption Heat Pump"), in which low-temperature heat which is to be brought to a usable level, is removed entirely or in part from the outside or ambient air.

Generally, in heat pump installations which use ambient air as the heat source, two modes of operation can be distinguished. In one mode, the evaporation temperature is at about 0° C. or higher. This has the advantage that the ambient-air heat exchanger cannot freeze up. However, the operating time of the plant is limited considerably since operation is confined to times when the air temperature is above 0° C. In the second mode of operation, the evaporation temperature is chosen below 0° C. In this case, heat can still be extracted from the air even at ambient temperatures of, for instance, −5° C. The operating time is therefore long and the amount of heat which is extracted from the environment and fed to the heating system during the winter is large. However, depending on the weather, frost or ice is formed on the outside surface of the evaporator. This has an adverse effect on the heat transfer to the working medium and, thereby, the efficiency of the installation since the installation must be thawed out periodically.

Accordingly, it is an object of the invention to utilize the advantages of the two modes of operation described above as far as possible together without having to tolerate their disadvantages.

It is another object of the invention to provide an absorption heat pump installation which can be efficiently operated.

It is another object of the invention to provide an absorption heat pump installation which is of relatively simple construction.

It is another object of the invention to increase the operating time of a heat pump installation without the need to use evaporation temperatures below 0° C.

It is another object of the invention to obtain the highest possible ratio of extracted usable heat to the heat fed into an absorption heat pump installation from an external source.

It is another object of the invention to use heat instead of electricity as the energy fed to an absorption heat pump installation.

Briefly, the invention provides an absorption heat pump installation which is comprised of an expeller for receiving a hygroscopic absorption medium with water, a condensor connected to the expeller to receive and condense a flow of steam therefrom, an absorber receiving said hydroscopic absorption medium, a pump for pumping the absorption medium at high concentration through the expeller and absorber and means for circulating water through the absorber, expeller and condensor. In addition, the installation has an energy accumulator for receiving a part of the water, a vapor line communicating an exposed water surface in the accumulator with the absorber to deliver water vapor to the absorber and a water loop passing through the accumulator. The water loop has at least one low-temperature heater connected to the accumulator to receive and heat a flow of water from the accumulator.

The absorption medium and its concentration are selected so that the absorption temperature, at the pressure prevailing at the triple point of the water, is higher than the temperature of the water flowing through the absorber in order to remove absorption heat.

The construction and use of the installation is based upon boundary conditions which are: maximum efficiency of the plant, i.e. the highest possible ratio of extracted usable heat to the heat fed into the plant from an external source; the use of heat instead of electricity as the energy fed to the plant; and the possibility of supplemental heating for operating periods during which the installation cannot operate as a heat pump in a simple manner.

Because of the use of an energy accumulator on the cold side, the times of heat absorption and heat delivery of the installation are independent of each other, at least, to a large degree. Thus, for example, during times when outside temperatures above 0° C. prevail during the day, i.e. especially at noon and in the afternoon, the accumulator can be charged. In such cases, the accumulator can be discharged during the night and/or morning hours.

In another embodiment, instead of using water as a coolant in the condensor and absorber, use can be made of air for cooling purposes.

The choice of water as the working medium as well as of a suitable absorption medium in a favorable concentration range allows the accumulator as well as the evaporator and absorber to operate, in normal operation, at the triple point of the water, i.e. at a pressure of about 6 mbar and to thereby utilize, through ice formation, the latently stored solidification heat when heat exceeding the energy supply is extracted. While ice accumulators are known, their construction in which the heat is exchanged indirectly through tubes or the vessel wall, heretofore had the great disadvantage that the ice is first formed at the tubes or walls and blocks the heat flow like an ever-increasing layer of insulation. In the present installation, this difficulty is avoided by the provisions that the accumulator is at the same time the direct evaporator in a heat pump loop.

Water that is not yet turned to ice in the accumulator is pumped through the low-temperature heater, e.g. an outside-air heat exchanger, and extracts heat from the ambient air. Since the same medium (water) as the working medium in the absorption loop serves as the medium in the accumulator and as the heat carrier in the ambient-air heat exchanger, no additional heat exchanger is required as in the presently used installations with outside-air heat exchangers and accumulators which require an additional temperature gradient.

Further advantages of the installation are, for instance, that under frequently occuring weather conditions, the outside air heat exchanger is in operation only during the day, when the noise level permitted by law or regulation is higher than at night. The ice accumulator has, in addition, a large storage capacity at constant temperature because it is possible to utilize the latent solidification heat. No additional heat exchanger surfaces are needed in the accumulator itself. Due to the decoupling in time of heat absorption and delivery, the low-temperature heat exchanger in the heat pump loop may be in the form of a low-temperature heat source selected from the group consisting of waste water, river water and ground water. The use of water as the working medium is absolutely harmless and environment-compatible. Further, ground and river water are particularly not contaminated. Also, use can be made of a solar heater as the low-temperature heat exchanger.

The expeller can be heated directly by a heating means, such as an oil and/or gas burner, without an intermediate heat carrier, since the pressure in the expeller is less than 1 bar. In working media other than water, the pressure in the expeller is above atmospheric pressure, so that the expeller may be subjected to special safety regulations. Due to the energy supply to the installation by means of oil or gas, supplemental heating for cold days can be incorporated into the installation very simply and inexpensively.

If the installation is used for cooling a house, the atmosphere of the house to be air-conditioned, for instance, can be used as the low-temperature heat source. In this case, it is particularly advantageous to generate ice in the accumulator in regions with a continental climate (hot days and relatively cool nights), by giving off heat to the cold night air with relatively high efficiency during the night and to store "cold". The ice is then melted again by the heat extracted from the room temperature.

Figure 2:
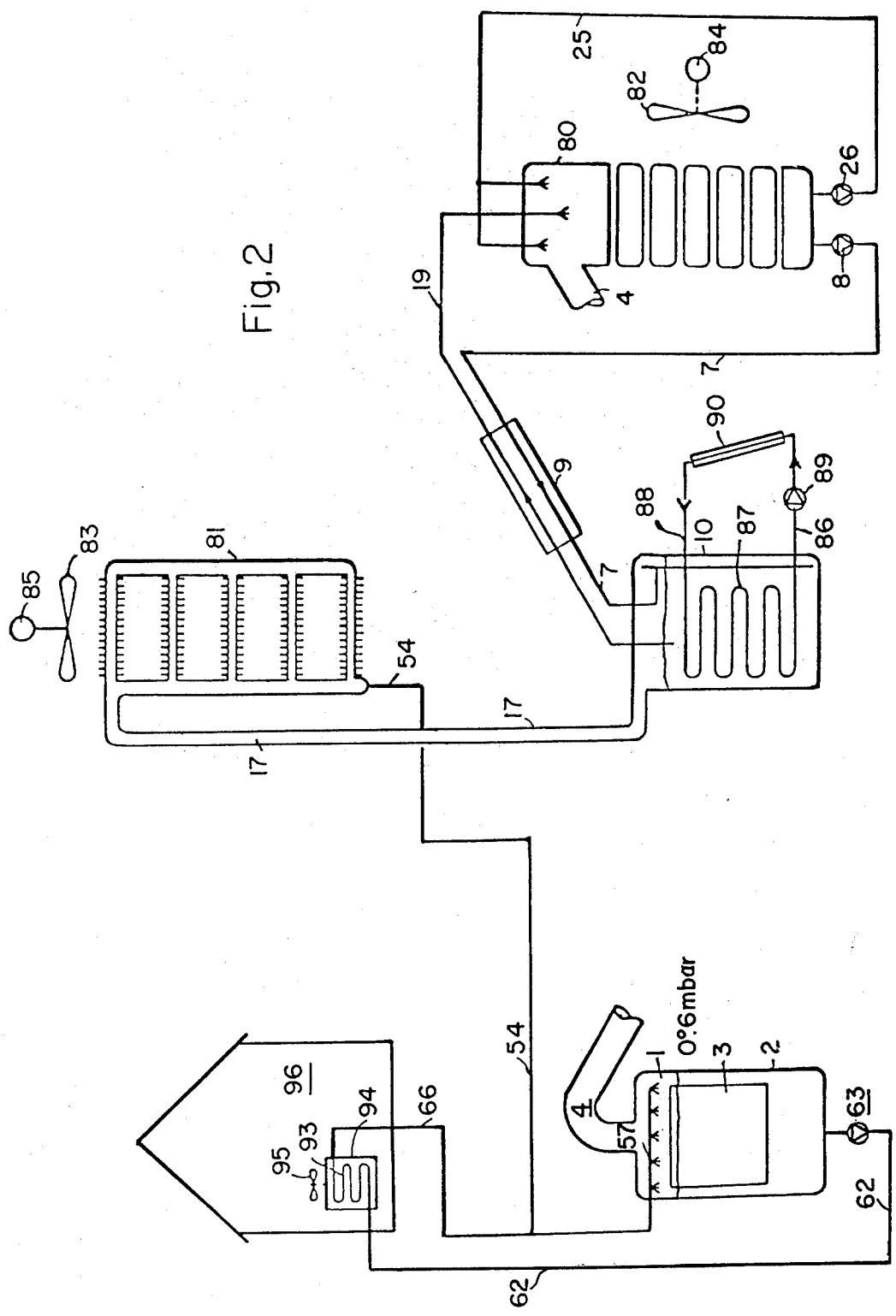

These and other objects and advantages of the invention will become more apparent from the following detailed description and appended claims taken in conjunction with the accompanying drawings in which:

FIG. 1 diagrammatically illustrates an installation according to the invention for room utility-water heating; and FIG. 2 illustrates a variant of the portion of the plant to the right of line II-II in FIG. 1.

Referring to FIG. 1, the absorption heat pump installation utilizes an energy accumulator, such as an ice accumulator 2, constructed as a direct evaporator. The ice accumulator 2 receives water and has a vapor space 1 above an exposed surface of the water. As indicated, a part of the water is frozen in the form of a block of ice 3.

The accumulator 2 has a vapor line 4 which communicates the exposed water surface with an absorber 5. The absorber 5 receives a hygroscopic absorption medium, for example, an aqueous mixture of sodium-potassium hydroxide having a mass ratio of from 1 to 3 to 3 to 1. The absorber 5 is connected with the vapor line 4 in such a manner that the water vapor which is received can be absorbed by the absorption medium to develop heat. The water-enriched absorption medium is then able to accumulate on the bottom of the absorber while the heat which is generated can be removed via a suitable coolant as described below.

The installation also has an expeller 10 for receiving water. As shown, the absorber 5 is disposed in a loop along with a means for cycling the absorption medium through the absorber 5 and the expeller 10. This means is in the form of a line 7 which leads from the bottom of the absorber 5 to the expeller 10, a return line 19 which extends from the expeller 10 to the upper end of the absorber 5 and a pump 8 which serves to pump water enriched absorption medium from the absorber 5 via the line 7 to the expeller 10. In addition, a heat exchanger 9 is disposed across the lines 7, 19 so as to permit a heat exchange between the flows in the respective lines 7, 19. As indicated, the line 7 has an overflow 11 within the expeller 10 as well as an outlet 12 arranged near the bottom of the expeller 10. This outlet 12 serves to prevent a short circuit between the water-enriched absorption medium flowing to the expeller and a water-depleted absorption medium flowing back to the absorber 5. The overflow 11 extends into a vapor space at the upper end of the expeller 10 and allows the water-enriched absorption medium to flow out even if the bottom outlet 12 is clogged by absorption medium which may have crystalized out, for instance, due to excessive water extraction.

The expeller 10 is heated by a heating means, such as a fossil fuel type, e.g. an oil and/or gas burner 13 having a flame which is located in a combustion chamber 14 arranged below the liquid level in the expeller 10. This heating means serves to heat at least some of the water in the expeller 10 to steam. The heating means is also associated with a flue gas line 15 for exhausting flue gas from the expeller 10 after heat has been given off to the liquid in the expeller 10. The flue gas can be discharged from the installation or can be used for the further recovery of heat, for example in a heat exchanger 16 as described below.

The expeller 10 is disposed in a loop with a condenser 18 which serves to receive and condense a flow of steam from the expeller 10. To this end, the loop includes a steam or water vapor duct 17 which extends from the vapor space of the expeller 10 into an upper end of the condensor 18.

As indicated, the absorption medium which becomes concentrated in the expeller 10 during separation passes from the liquid in the expeller 10 via the line 19 through the heat exchanger 9 while transferring heat to the incoming water-enriched solution flowing in the line 7. The water-depleted solution thereafter flows via a controllable throttling element 20 back into the absorber 5. To this end, a nozzle 21 is provided at the end of the line 19 to allow the solution to trickle down into the absorber 5.

The condenser 18, in which the steam being the working medium of a heat pump is condensed, is completely filled with water. This water is fed in as cold water via a line 28 and is conducted as hot utility water via a line 29 to consumers (not shown). In addition, the condenser 18 is internally separated by a partition 30 into a cold water space 32 and a hot water space 33. As indicated, the partition 30 has only one passage opening 31 of relatively small cross-section between the two spaces 32, 33. This partition 30 serves to prevent mixing of relatively cold and hot utility water. The outflowing utility water temperature is measured at the utility water outlet from the condenser 18 by a temperature sensor 48 by which, via an on/off control 49, the burner 13 in the expeller 10 is set in operation and shut down, respectively.

The installation also has a further loop for cycling a flow of water through the condenser 18 to cool the steam therein while obtaining a heated flow of water. As shown, this loop includes a heat exchanger 34 which is disposed in the cold water space 32 and two additional heat exchangers 42, 50 which are disposed within the condenser 18. The first heat exchanger 34 is connected on the inlet side via a pump 35 and a three way valve 36 to a return line 37 of a heating system (not shown) which receives the hot water from the line 29. The outlet of the heat exchanger 34 leads, via a line 38 and a three way valve 39 to an inlet line 52 of the uppermost heat exchanger 50 which is located in a steam chamber 53 of the condenser 18.

The outlet of the heat exchanger 50 connects to the heat exchanger 42 in the hot water space 33 in parallel with an inlet line 41. The outlet of the heat exchanger 42 communicates via a line 43 in which a three way valve 45 is disposed with a suitable consumer (not shown). As indicated, the three way valve 45 is controlled by a temperature control 44 which, in turn, is influenced by an actual-valve temperature sensor 46 disposed in the outlet of the line 43 to the consumer (not shown) as well as a temperature sensor 47 for the outside temperature.

The installation also has a suitable means for directing a flow of water as a coolant from the utility water loop into heat exchange relation with the absorption medium in the absorber 5. To this end, the absorber 5 is provided with a heat exchanger 6 and, a pair of lines 40, 41 connect the opposite ends of the heat exchanger 6 to the hot water loop to permit a flow of water through a heat exchanger 6. As indicated, the inlet line 40 connects to the three way valve 39 in the line 38 so as to receive a cold flow of water while the line 41 leads to the inlet of the heat exchanger 42. A branch line 78' also extends from the line 41 to the three way valve 36 in the return line 37.

Because of irreversible losses in the heat exchanger 6, it is advantageous to keep the circulating quantity of absorption medium solution as small as possible. Nevertheless, in order to obtain good heat removal in the absorber 5 without having to make the heat exchanger for the heat transfer to the heat-removing water excessively long, the heat exchanger 6 may be comprised of a two part tube assembly in the form of a double spiral. In this regard, the outer turns 24 of one part of the heat exchanger 6 initially receive the incoming water of the heating system and are wetted by water-enriched condensate of the absorption medium in concurrent flow. To this end, the absorption medium is circulated by a circulating pump 26 in a separate loop 25 which is provided for this purpose. The inner turns 22 of the other part of the heat exchanger convey the water in counter current flow to the water-depeleted absorption medium which is trickled down over the turns 22 from the nozzle 21.

The liquid level of the condensate in the absorber 5 is held at least approximately at a constant level by use of a level control 23, for instance, a float, which influences the throttling element in the line 19.

A vacuum pump 27 may also be connected to the vapor space in the absorber 5. This vacuum pump 27 serves to remove gas which has penetrated into the installation and operates at a relatively low pressure during normal operation to insure the necessary vacuum of about 6 mbar is maintained.

The ice accumulator 2 is disposed in a secondary water loop which also contains at least one low temperature heater which is to be used for heat storage. To this end, the heater is connected to the accumulator 2 to receive and heat a flow of water from the accumulator 2 while a return line is provided between the heater and the accumulator 2 to return a heated flow of water to the accumulator. As shown, the secondary water loop includes a line 62 which leads from the bottom of the evaporator 2 via a feed pump 63 and a three way valve 64 to a heater in the form of an outside-air heat exchanger 65. This heat exchanger 65 has a return line 66 which passes back to the accumulator 2. This return line 66 may pass through heat exchangers 67, 16 which are provided for the recuperation of heat, for example from low-temperature heat sources such as waste water (via exchangers 67) and flue gases (which pass through the exchanger 16 via the flue gas line 15), respectively. These exchangers 67, 16 thus act as additional low-temperature heaters. As indicated, the return line 66 communicates with a plurality of nozzles 57 which are located in the upper part of the accumulator 2.

In addition, the secondary water loop also has a line 68 which branches from the three way valve 64 to the line 66 in parallel with the heat exchanger 65. At temperatures of the ambient air below 0° C., the outside air heat exchanger can be short circuited on the water side via the line 68. In this case, the heat exchanger 65 is preferably arranged relative to the accumulator 2 at a static height such that the heat exchanger 65 can be emptied automatically in the event of a short circuit in order to prevent freezing of the heat exchanger 65.

A blower 69 which is driven by a motor 70 may also be used to blow air through the heat exchanger 65. The motor 70, valve 64 and pump 63 are switched on or off via a control element 71. As indicated, the control element 71 receives an input signal corresponding to the outside air temperature as measured by a sensor 72 and a signal which corresponds to the water temperature in the accumulator 2 as measured by a temperature sensor 73 in the line 62.

The pump 63 is constructed as a two stage pump and is responsive to a short-circuiting of the outside-air heat exchanger 65 is order to operate in one stage at a lower output than in the other stage. For example, while the outside air temperature may cause a short circuit of the heat exchanger 65 and shut down of the motor 70 at air temperatures below 0° C., a control signal is generated for the simultaneous reduction of the output of the pump 63. This signal passes through a control element 77 which receives a further input signal E from a control element 74 (described below). The control element 77, in turn, causes a reduction or the shut down of the pump, depending upon the operating condition of the installation as indicated by the control element 74. For example, a reduction of the output of the pump 63 is effected in the event of a short circuit of the heat exchanger 65 during normal operation of the installation, that is for a heat pump operation and an air temperature below 0° C. A shut down is effected in cold-weather operation (to be described below) and at air temperatures below 0° C.

If the heat supply is sufficient, the temperature sensor 73 can influence the pump 63, valve 64 and motor 70 at relatively high air temperatures. In this case, the accumulator is not operated as an ice accumulator (since there is a sufficient supply of heat) but rather as an ordinary water accumulator at high pressure and high temperatures. In addition, the installation is not operated at the triple point of water. These conditions occur automatically. In this operating condition, which is frequent during transition periods, heat withdrawal from the outside air is possible, of course only if the temperature is above that of the water in the accumulator 2. In this case, the heat exchanger 65 and the switching of the pump 63, valve 64 and motor 70 are used only at a predetermined positive minimum temperature difference between the values measured by the sensors 72, 73.

As shown, a line 54 is connected between the steam chamber 53 and the return line 66 of the heat pump loop in order to convey a flow of water from the chamber 53 to the line 66. In addition, a valve 56 is disposed in the line 54 for selectively closing the line 54 to the return line 66. Between the elements 55 and 56a return line 59 branches off the line 54 and runs into the expeller 10 near its bottom.

In addition, the return line 59 contains an expansion element 55 constructed as a steam trap and is provided with a second vacuum pump 58 which serves to maintain the low pressure in the event of a gas break-in due to leaks. Also, a supplemental water accumulator 60 of relatively small capacity is disposed in the return line 59 for receiving water from the condensor 18 in response to short circuiting of the accumulator 2. Also, a valve 61 is disposed in the line 59 downstream of the accumulator 60.

The valves 56, 61 and the control elements 74 serve as a control means for short circuiting the flow of water to the accumulator 2 in response to a substantially total solidification of the water in the accumulator 2. To this end, closing of the valve 56 closes the line 54 while a simultaneous opening of the valve 61 opens the line 59 back to the expeller 10. This takes place at times when heat pump operation is not possible and the accumulator 2 is completely "frozen up" since there is no suitable low temperature heat source of sufficient capacity. The water accumulator 60 then serves as a water filled buffer volume through which the solution in the expeller 10 is diluted and thereby prevented from crystallizing out.

During operation, the heat exchanger 34 and the cold water space 32 of the condenser 18 has a 2-fold purpose. During summer operation of the installation which requires no room heating, the utility water is preheated by means of the heat obtained in the absorber 5 before being brought to its final temperature by the steam which comes from the expeller 10 and is condensed in the steam chamber 53 of the condensor 18. During the other operating conditions, as described below, the return water of the heating system from the line 37 is cooled in the heat exchanger 34 by cold utility water so as to receive an entrance temperature as low as possible before passing into the absorber 5. This is advantageous for thermo-dynamic efficiency.

After being preheated in the absorber 5, the water passes into the heat exchanger 42 in the hot water space of the condensor 18 and is heated to the desired final temperature. The hot water may then flow through the line 43 for suitable use. In addition, the hot water in the line 43 may be admixed with cold water from the line 38 via a branch line 51 therebetween and the valve 45. In this case, the return flow of the heating system can be used for controlling the outlet temperature in the line 43 as is known. Since the coldest water of the heating system flows in the line 38, the amount of water required for admixing is maintained as small as possible.

The operation and interconnection of the various heat exchangers 34, 42, 50 for different operating conditions of the installation is described below.

If the accumulator 2 is "exhausted" due to heavy demand for heat (characterized by the solidification of the entire accumulator content) the regulating or control element 74 allows a switching of the installation from heat pump operation to pure heating or cold-weather operation. When the installation operates exclusively as a pure heating plant, high level energy is supplied by the burner 13 which thus acts as a high temperature heat source.

The mentioned exhaustion condition in the accumulator 2 causes the solution concentration in the expeller 10 to rise. This results in a dropping of the pressure and/or an increase of the temperature of the liquid in the expeller 10. This condition can be determined by a pressure sensor 75 in the steam line 17 and, simultaneously, a sensor 76 which measures the temperature of the concentrated absorption medium in the expeller 10. Both measurement values are to insure that the concentration of the solution does not exceed a certain upper limit at which the absorption medium is still present in a homogeneous aqueous solution and does not crystallize out. Because of the heavily reduced supply of steam, an undue increase of this concentration indicates that the accumulator 2 is exhausted due to the complete solidification of its water content.

When the accumulator 2 is exhausted, the control element 74 causes the three way valve 39 in the heating system loop to be changed. Whereas, in normal operation, the valve 39 connects the lines 38, 40 to each other, the valve 39 serves to short circuit the absorber 5 so that the water is conducted, in cold-weather operation, from the line 38 into the line 52 to the heat exchanger 50 in the steam chamber 53 of the condenser 18. The absorber 5 is thus removed from the heating system loop. This operation is symbolized in FIG. 1 by "A" at the output of the control element 74 and at the input of the signal line into the valve 39.

At the same time, the control element 74 emits a switching command to the valve 56 in the line 54 and the valve 61 in the return line 59 so as to short circuit the accumulator 2 by closing the valve 56 and opening the valve 61 for cold-weather operation. Finally, the control element 74 emits the signal E to the control element 77. The control element 77 thus, at temperatures below 0° C., turns off the pump 63 in dependence upon the signal of the control element 72 while, at air temperatures above 0° C., the pump 63 continues to operate unchanged at full output. The control element 72 is thus used to indicate whether the outside air temperature is above or below 0° C.

A blower 78 which is driven by a motor 79 may optionally be provided in the line 4 which connects the accumulator 2 to the absorber 5. This blower serves, in normal operation of the installation, to increase the pressure in the absorber 5 over the triple point pressure of the water prevailing in the accumulator 2 as before. The motor 79 can be switched on and off by an on/off control 89 which is actuated by the outgoing temperature control 44 of the heating loop as a function of the set point value of the outgoing temperature.

As noted above, there are essentially three operating conditions that can be distinguished in the operation of the installation, namely normal, cold-weather and summer operation. As described in part above, the working medium, i.e. water, of the heat pump loop flows in a path from the accumulator 2 through the absorber 5 during normal operation and in summer operation. The water is then absorbed by the absorption medium in the absorber 5 and is conveyed therewith to the expeller 10. The water then flows as expelled steam into the condenser 18, is condensed and then flows back via the line 54, steam separator 55 and nozzles 57 into the accumulator 2. However, in cold weather operation utilizing a pure heating operation, the return flow of water flows directly from the condenser 18 through the line 59 back into the expeller 10.

If during normal operation, more heat is extracted from the accumulator than can flow into the accumulator 2 via the heat pump loop and the low-temperature heaters 65, 67, 16 (and optionally other sources, for example such as solar heaters), the accumulator 2 is cooled down slowly while the working medium pressure in the installation continues to drop. At 0° C. and at a water vapor pressure in the accumulator 2 of 6 mbar, which adjusts itself automatically in accordance, part of the water begins to solidify upon further heat deficit. The accumulator then operates as an ice accumulator until the water is again completely liquified through a positive heat balance, i.e. with the heat supply exceeding heat extraction, and the steam pressure and temperature in the installation begin to rise again if the energy balance continues. The vacuum pumps, 27, 58 insure that non-condensable gases which pass into the system through leaks are drawn off.

During normal operation, the water of the hot water loop which is used as the coolant in the absorber 5 and the condenser 18 passes from the return line 37 through the heat exchanger 34 in the cold water space 32 of the condensor 18 and then passes through the lines 38, 40 into the outer turns 24 and then the inner turns 22 of the double spiral heat exchanger 6 within the absorber 5. Thereafter, the water flows into the heat exchanger 42 via the line 41 and is passed through the mixing point in the valve 45 back into the utility loop as the outgoing medium.

If the set point of the outgoing temperature for heating purposes is above, for instance, the values of 54° C. and 52° C., respectively, as indicated on the line 43, then the blower 78 in the line 4 is set in operation. This increases the pressure in the absorber 5 over that in the accumulator 2 by a few millibars, for example from 6 mbar to 8 to 9 mbar. As a result, the temperature in the absorber increases over that at the lower pressure. Thus, higher temperatures are obtained on the water side, i.e. for the outgoing flow of the heating system so that the outgoing water can be heated to about 60° C. The starting up of the blower 78 is triggered, if an upper limit formed in the control 44 as a function of the measured value of the outside air temperature sensor 47 is exceeded for the forward temperature of the heating system. The motor 79 is turned off if the temperature subsequently falls below this limit.

In cold-weather operation, the heat exchanger 34 is not connected to the absorber 5 since the absorber 5 is shut down during this condition. Instead, the heat exchanger 34 connects via the line 52 to the heat exchanger 50 in the steam chamber 53. The water then flows through the heat exchanger 50 before passing into the heat exchanger 42 in which the heating water is heated to its final temperature. The water then takes the same path as during normal operation.

In summer operation, the heating loop is switched off. Also, the pump 35 transports the water through the heat exchanger 34, line 38 and line 40 to the double spiral heat exchanger 6 in the absorber 5 and then via the lines 41, 78' and 3-way valve 36 to the pump 35 in a closed loop manner. The utility water is brought independently to the desired end temperature in the hot water space 33 by the steam from the expeller 10.

As indicated in FIG. 1, various temperature values are noted at different points of the installation. These temperatures occur or are obtained in the above described installation during normal operation.

Referring to FIG. 2, wherein like reference characters indicate like parts as above, the installation can be modified so as to allow cooling of a building exclusively especially in hot regions with a continental climate. To this end, the outside-air heat exchanger 65 can be replaced by a room-air heat exchanger 93 for the room air to be cooled in a building (not shown). The heat exchanger 93 forms part of a room air conditioning system 94 which is indicated schematically. This system 94 conveys the room air of the building 96 via a fan 95 which is cooled by the water of the heat pump system. However, if neither room nor utility water heating is required of an installation, it may be advantageous to use air as the coolant for the absorber and the condensor of the installation. In this case, the absorber 5 is replaced in FIG. 2 by an air-cooled absorber 80 and the condensor 81 is constructed so that condensation heat is discharged into ambient air. In order to transport air streams through the absorber 80 and condensor 81, blowers 82, 83, respectively are utilized. Each of these blowers is driven by a suitable motor 84, 85 as indicated.

In addition, a heat exchanger 87 can be provided in the expeller 10 as a heating means instead of a burner 13. Such a heat exchanger 87 may be connected via lines 86, 88 to a solar collector arrangement (90) of known design which operates as a high temperature heat source. Water likewise circulates as the heat carrier medium in a separate closed loop between the solar collector 90 and the heat exchanger 87. This arrangement allows the use, in zones where cooling is primarily required, of the usually intensive solar radiation for generating and storing ice during the day and the use of the stored ice during night hours for room cooling.

If a burner 13 is retained in an installation as shown in FIG. 2, the burner can be operated to particular advantage in such a manner that cold is stored during the night by generating ice in the accumulator 2. This ice can then be used for room cooling during the day. In this embodiment, the installation operates as an air cooled absorption refrigeration plant in which an ice accumulator is provided as the "cold" accumulator. The excess heat can then be discharged advantageously to the cold night air with a relatively large temperature gradient.

It is, of course, possible to achieve room and/or utility water heating as well as cooling of a building through logical combinations of the installation shown in FIGS. 1 and 2. For example, a parallel arrangement of an outside-air heat exchanger 65 and a room-air heat exchanger can be utilized as low-temperature heaters.

What is claimed is:

1. An absorption heat pump installation comprising
an absorber receiving a hygroscopic absorption medium;
an expeller for receiving said hygroscopic absorption medium with water;
a condenser connected to said expeller to receive a flow of steam therefrom and to condense the stream;
a pump for pumping the absorption medium at high concentration through said expeller and absorber;
means for circulating water through said absorber, expeller and condenser;
an energy accumulator receiving a part of the water;
a vapor line communicating an exposed water surface in said accumulator with said absorber to deliver water vapor to said absorber; and a water loop being connected to said accumulator and having at least one low-temperature heat source to receive and heat a flow of water from said accumulator; said hygroscopic absorption medium and its concentration being selected so that the absorption temperature at the pressure prevailing at the triple point of the water is higher than the temperature of the water flowing through said absorber in order to remove absorption heat.

2. An installation as set forth in claim 1 wherein said means for circulating water includes a loop for cycling a flow of water through said condenser as a coolant to cool the steam therein and obtain a heated flow of water and means for directing a flow of water as a coolant from said loop into heat exchange relation with the absorption medium in said absorber.

3. An installation as set forth in claim 2 wherein said means for directing a flow of water into said absorber comprises a two-part tube assembly in said absorber having one part for receiving concentrated absorption medium thereon in counterflow relation and a second part for receiving diluted absorption medium thereon.

4. An installation as set forth in claim 1 wherein said low-temperature heat source is an outside-air heat exchanger.

5. An installation as set forth in claim 4 which further comprises means for short-circuiting said outside-air heat exchanger in dependence upon an outside temperature.

6. An installation as set forth in claim 5 wherein said water loop further comprises a two-stage pump for pumping water through said water loop, said pump being responsive to a short-circuiting of said outside-air heat exchanger to operate in one stage at a lower output than in the second stage thereof.

7. An installation as set forth in claim 1 wherein said low-temperature heat source is a room-air heat exchanger.

8. An installation as set forth in claim 1 wherein said low-temperature heat source is selected from a group consisting of waste water, river water, ground water and a solar heater.

9. An installation as set forth in claim 1 which further comprises a heating means in said expeller for heating at least some of the water in said expeller to steam and a flue gas line for exhausting flue gas from said expeller, and wherein said low-temperature heat source is a heat exchanger in said flue gas line.

10. An installation as set forth in claim 1 wherein said absorption medium is an aqueous mixture of sodium-potassium hydroxide having a mass ratio of from 1 to 3 to 3 to 1.

11. An installation as set forth in claim 1 which further comprises a control means for short-circuiting the flow of water to said accumulator in case of a substantially total solidification of the water in said accumulator.

12. An installation as set forth in claim 11 which further comprises a supplemental water accumulator for receiving water from said condenser in response to short-circuiting of said energy accumulator.

13. An installation as set forth in claim 1 which further comprises a heating means in said expeller for heating at least some of the water therein to steam.

14. An installation as set forth in claim 13 wherein said heating means is a fossil-fuel type heating means.

15. An installation as set forth in claim 13 wherein said heating means is a solar energy collector.

16. An installation as set forth in claim 1 which further comprises means between said accumulator and said absorber for increasing the water vapor pressure of the vapor delivered to said absorber.

17. An absorption heat pump installation comprising
an absorber receiving a hygroscopic absorption medium;
an expeller for receiving said hygroscopic absorption medium with water;
a condenser connected to said expeller to receive a flow of steam therefrom and to condense the steam;
a pump for pumping the absorption medium at high concentration through said expeller and absorber;
first means for passing air through said condenser as a coolant to condense the steam therein;
a second means for passing air through said absorber as a coolant to cool the absorption medium therein;
means for circulating water through said absorber and said expeller;
an energy accumulator receiving a part of the water;
a vapor line communicating an exposed water surface in said accumulator with said absorber; and
means for heating the water in said accumulator; and heating means for heating at least some of the water in said expeller to steam.

* * * * *

UNITED STATES PATENT AND TRADEMARK OFFICE
CERTIFICATE OF CORRECTION

PATENT NO. : 4,285,209

DATED : August 25, 1981

INVENTOR(S) : Johannes Luthi, et al.

It is certified that error appears in the above—identified patent and that said Letters Patent is hereby corrected as shown below:

Column 10, line 60, change "stream" to --steam--.

Signed and Sealed this

Fifteenth Day of December 1981

[SEAL]

Attest:

GERALD J. MOSSINGHOFF

Attesting Officer     Commissioner of Patents and Trademarks